United States Patent [19]

Sternberg

[11] 4,093,749

[45] June 6, 1978

[54] PREPARATION OF YEAST LEAVENED DOUGH PRODUCTS

[76] Inventor: George P. Sternberg, 727 W. 46th St., Kansas City, Mo. 64112

[21] Appl. No.: 712,721

[22] Filed: Aug. 9, 1976

Related U.S. Application Data

[63] Continuation-in-part of Ser. No. 525,359, Nov. 20, 1974, abandoned.

[51] Int. Cl.² .................... A21D 2/04; A21D 2/14
[52] U.S. Cl. ............................... 426/20; 426/19; 426/25; 426/26; 426/27; 426/62; 426/64; 426/549
[58] Field of Search ............... 426/18, 19, 20, 21, 426/23, 24, 25, 26, 27, 650, 549, 64, 62

[56] References Cited

U.S. PATENT DOCUMENTS

| | | | |
|---|---|---|---|
| 3,053,666 | 9/1962 | Henika et al. | 426/19 X |
| 3,713,844 | 1/1973 | Sternberg | 426/27 |
| 3,758,311 | 9/1973 | Fortmann | 426/20 |

OTHER PUBLICATIONS

Chemicals Used in Food Processing, publication 1274, National Academy of Sciences–National Research Council, Washington, D. C., 1965 (pp. 163 & 265).
Food Additives, Chemical and Engineering News, vol. 44, 1966 (pp. 100, 102, 109 & 110) Tp 1 I418.

*Primary Examiner*—David M. Naff
*Attorney, Agent, or Firm*—Lowe, Kokjer, Kircher, Wharton & Bowman

[57] ABSTRACT

A dough composition including flour, water, yeast, a starch digesting agent, a yeast nutrient and monosodium glutamate is used to prepare baked products such as bread and rolls. After mixing, the dough is allowed to relax and is then machined, proofed and baked. The monosodium glutamate acts as a gluten reducing agent for a short period during mixing and subsequently accounts for an oxidizing effect over an extended period.

11 Claims, No Drawings

PREPARATION OF YEAST LEAVENED DOUGH PRODUCTS

BACKGROUND AND SUMMARY OF THE INVENTION

This is a continuation-in-part application of my application Ser. No. 525,359, filed Nov. 20, 1974, now abandoned.

The invention relates to the making of dough and particularly to the making of yeast leavened dough for minimal production time. More specifically, the invention deals with a batch method, yeast leavened dough which has all of the desirable qualities for making bread and rolls as found in products made by the well-known sponge dough method.

The sponge method, while achieving a very desirable product, is found objectionable because it involves a long period for fermentation of the sponge before the final mixing of ingredients with the sponge in order to make the dough. The desirable characteristics of dough made by the sponge dough method include a better flavor, a more pleasing aroma, and a more uniform grain structure than doughs made by a method in which there is not the separate step of making a sponge, fermenting it and adding the rest of the dough ingredients to the fermented sponge to make the dough. Also, dough made by the sponge dough method has greater extensibility and better gas retention qualities than doughs made by other methods. To obtain such extensibility it is necessary for the fermentation process to effect chemical and physical changes on the gluten and starch of the flour in order to produce small uniform cells, fine grain, a soft texture and good keeping quality in the baked product.

In the past, various compositions have been devised in an attempt to accomplish the production of yeast leavened bakery products that approach the good quality of sponge dough products without providing the customary fermentation period required by the sponge dough method. One method of avoiding the fermentation period has been to start the dough making process with a brew which has been previously made with the aid of extra equipment and considerable time. A brew is usually employed in connection with a continuous mixing process utilizing a continuous mixer into which the ingredients including the brew are fed and are then discharged from the mixer after going through a relatively short mixing period.

By contrast with the continuous mixing technique, doughs made by the sponge dough method are formed into loaves or other shapes by machining the dough to divide the batch into loaf-size portions, rounding each dough portion into a ball, sheeting the ball of dough and finally coiling the sheeted piece of dough onto itself to form a loaf. This process naturally involves considerable molding equipment which is eliminated in the continuous mixing method. With the latter method, the dough discharged from the continuous mixer is customarily passed into an extruder from which it is extruded into pans in loaf-size pieces. Either method, however, requires considerable mechanical equipment.

In comparing these two manufacturing techniques, an additional consideration is production time. Although the sponge dough method makes a product superior to that of the continuous mixing method, the former technique involves a lot of time between the initial mixing of the sponge and the final production of the dough loaf therefrom, principally because of the long fermentation period required by this method to produce a good product.

Problems attendant with the foregoing production methods have resulted in the development of a technique commonly termed a short-time or no-time method. By elimination of the fermentation period or the brew, either considerable time and labor or extra equipment that is otherwise required is eliminated in the no-time method.

One of the difficulties encountered in trying to devise a suitable composition for such a no-time or short-time dough has been that most bench-scale tests of such a method have been in laboratories in which doughs are mixed in a small, laboratory mixer. In mixer of this kind, the mixing head and its blades travel in a circular path around a central fixed pin or post in the center of a stationary small bowl. Thus, rotation of the mixing head is about a vertical axis. This is entirely different from the commercial mixing of doughs by the batch method in a bakery in which the mixer arms rotate about a horizontal axis in the trough-like body of the mixer. Also, the mass that is processed in the commercial dough mixer is several hundred times larger than a test dough and the rotation of the commercial mass about a horizontal axis moves the dough mass up and down in substantially vertical direction and exerts a pounding or beating effect on the dough mass that is not accomplished in a laboratory mixer. As a result, the bread quality obtained in the commercial bakery mixer is often quite different from that obtained in a laboratory mixer using the same formula. These differences appear to be due to the pressures and forces magnified in agitating a larger mass of dough about a horizontal axis instead of a small mass about a vertical one.

Among the dough compositions that have been used in an attempt to provide a dough that has as good quality as one that is produced by the sponge dough method is a combination of potassium bromate with either L-cysteine hydrochloride monohydrate, glutathione or sodium bisulphide. The L-cysteine, glutathione or sodium bisulphide are used for producing a more pliable dough for carrying out the machining and loaf forming operations and the potassium bromate is used as an oxidizing agent to strengthen the gluten structure for gas retention and to provide a suitable loaf volume. Unfortunately the chemical compositions used for pliability and the oxidizing agent oppose each other in action, thus interfering with the most desirable results. Also, the high concentrations of certain chemicals referred to above usually produce an unpleasant flavor and aftertaste in the product made from the dough.

It is a purpose of my invention to provide a method of making a yeast leavened dough in which the usual ingredients of flour, water, yeast, a starch digesting agent, a yeast nutrient, sugar, salt and shortening are mixed with certain chemical additives. One of the chemical additives has the property of increasing the pliability of the dough during machining operations, such as machine loaf molding, and of then serving as an oxidizing agent that continues to act subsequent to the pliability increasing action to strengthen the gluten structure during the proofing of the loaf or other dough product to produce increased volume along with a fine uniform grain structure in the baked dough product.

Other and further objects of the invention, as well as the features of novelty appurtenant thereto, will appear in the course of the following detailed description.

DESCRIPTION OF THE INVENTION

My method is a batch method and the mixing of the dough is preferably carried out in a batch mixer of the general character shown in my U.S. Pat. No. 3,503,344, issued Mar. 31, 1970 and entitled "Dough Developing Agitating Means and Method". Mixers of the type shown in said patent have agitating means comprising agitator bars that are mounted to travel in a circular path around an axis extending horizontally through a mixer bowl having a wall portion curved concentrically to said axis and further comprising dough gripping means on the agitator bars.

The novel dough composition and method of this invention includes the usual dough ingredients such as flour, water, yeast, sugar, salt and shortening in proportions preferred by the baker mixed with a starch digesting agent, a yeast nutrient and a chemical additive. After mixing the dough is completed, the dough is allowed to relax before being machined to divide the dough mass into pieces of equal weight which are then formed into a desired shape such as a loaf in the case of bread. Finally, the shaped dough is proofed and baked.

For use in the dough composition, the starch digesting agent may be selected from the group consisting of wheat malt, barley malt and dehydrated malt syrup. Alternatively, digested starch may be utilized. Digested starch has the advantage of increasing the bonding of the gluten films on the surface of the starch granules. Such bonding is highly desirable because the various processing steps that the dough goes through in making it into a bread loaf or roll require that the strength of the cell structure of the dough be sufficient to withstand the force exerted on the dough by the processing steps. A method in which the digested starch is produced in a separate step from the fermentable dough mixture is disclosed in my U.S. Pat. No. 3,713,884, issued January 30, 1973 and entitled "Dough Making Method".

The yeast nutrient may be either ammonium chloride or ammonium sulphate and is preferably used in the proportion of 0.035 to 0.07 percent by weight of the flour content.

The chemical additive used in the dough comprises monosodium glutamate. The quantity of monosodium glutamate that is used as an additive may be 0.001 to 0.010 percent by weight of the flour content. If desired, known oxidizing agents such as potassium or calcium iodate may be added in combination with the monosodium glutamate to increase the gluten oxidizing action thereof, the proportion of said iodate used for this purpose being from 0.0005 to 0.003 percent by weight of the flour content.

Monosodium glutamate, while producing a slight gluten reducing or weakening function when used alone, also has the most useful faculty of being synergistic with other gluten reducing chemicals such as potassium iodate or L-cysteine hydrochloride monohydrate.

A small amount of potassium iodate or L-cysteine in combination with monosodium glutamate unexpectedly and markedly increases the first gluten reducing action without inhibiting the later loaf strengthening oxidizing reaction. L-cysteine may be added in the previously mentioned range of 0.0005 to 0.003 percent by weight of the flour content.

Although monosodium glutamate is known as a flavor enhancer in food products, I have discovered that monosodium glutamate as an additive in yeast leavened dough, while causing no difference in flavor, unexpectedly causes the weakening of gluten structure for a relatively short period followed by a strengthening of the gluten structure by oxidation over an extended period. The weakening action is frequently referred to in the art as gluten reducing action. This action of the monosodium glutamate is very desirable as it increases the pliability of the dough during the mixing and machining operations. The oxidation action of the monosodium glutamate which continues after the gluten reducing action is completed strengthens the walls of the gas cells during the proofing of the dough products to provide a uniform fine grained structure in the baked product with high volume. The use of potassium iodate, calcium iodate or L-cysteine as an additive in combination with monosodium glutamate markedly increases the gluten reducing action and then increases the oxidizing action of the same.

The baked product made from a dough made in accordance with my method and dough composition, using the additives in the proportions set forth herein, has the flavor and aroma of such a baked product made by the sponge dough method.

To exemplify the foregoing, the following examples are illustrative of the inventive method and dough composition.

EXAMPLE 1

The purpose of this test includes the comparison of monosodium glutamate in a no-time dough composition as a reducing-oxidizing ingredient alone and in combination with potassium bromate, ascorbic acid and calcium sulphate.

Dough formulations tested were as follows:

| Ingredient | Dough A | Dough B | Dough C | Dough D |
|---|---|---|---|---|
| Flour* | 700gms. | 700gms. | 700gms. | 700gms. |
| Water | 393gms. | 393gms. | 393gms. | 393gms. |
| Yeast | 28gms. | 28gms. | 28gms. | 28gms. |
| Salt | 14gms. | 14gms. | 14gms. | 14gms. |
| Sugar | 42gms. | 42gms. | 42gms. | 42gms. |
| Milk | 7gms. | 7gms. | 7gms. | 7gms. |
| Shortening | 14gms. | 14gms. | 14gms. | 14gms. |
| Yeast Nutrient | 4.9gms. | 4.9gms. | 4.9gms. | 4.9gms. |
| Monosodium Glutamate | 50ppm | 50ppm | 50ppm | 100ppm |
| Ascorbic Acid | — | 50ppm | — | — |
| Potassium Bromate | — | — | 50ppm | — |
| Calcium Sulphate | — | — | — | 1.5gms. |
| *includes starch digesting malt | | | | |
| Volume, c.c. | 2725 | 2688 | 2725 | 2713 |
| Rating | 84.5 | 84 | 83.5 | 83.5 |

With respect to production procedure in each of the foregoing rest doughs, approximately 85% of the flour and water was initially combined with the yeast and mixed in a laboratory mixer for 2 minutes at low speed and 8 minutes at high speed. With no time allowed for fermentation, the balance of ingredients was added and the dough was mixed 2 minutes at low speed and 9 minutes at high speed. The doughs were relaxed for a uniform time, and then machined, proofed and baked.

In comparing the breads produced from the doughs, Dough A was clearly superior bread, Doughs B and C exhibited a much coarser crumb structure, and Dough D was the most pliable.

EXAMPLE 2

The purpose of this test includes the comparison of monosodium glutamate at the 100 ppm level with a control and with the additional additive of 10 ppm L-cysteine hydrochloride monohydrate.

Dough formulations tested were as follows:

| Ingredient | Dough A | Dough B | Dough C |
|---|---|---|---|
| Flour* | 700gms. | 700gms. | 700gms. |
| Water | 393gms. | 393gms. | 393gms. |
| Yeast | 28gms. | 28gms. | 28gms. |
| Salt | 14gms. | 14gms. | 14gms. |
| Sugar | 42gms. | 42gms. | 42gms. |
| Milk | 7gms. | 7gms. | 7gms. |
| Yeast Nutrient | 14gms. | 14gms. | 14gms. |
| Monosodium Glutamate | — | 100ppm | 100ppm |
| Potassium Iodate | 6ppm | 6ppm | 6ppm |
| L-cysteine | — | — | 10ppm |

*includes starch digesting malt

Production procedure was the same as described in connection with Example 1.

In comparative tests, Dough B was softer and more pliable after mixing than Dough A and Dough C was softer and more pliable than Dough B. Strong oxidation and recovery action was exhibited in the dough formulations containing 100 ppm monosodium glutamate.

Further comparative tests similar to the foregoing reveal that the no-time process using 75 ppm monosodium glutamate produces superior bread quality than the standard 4½ hour fermentation process. Similar results are found for dextrinized wheat flour utilizing 50 ppm monosodium glutamate.

EXAMPLE 3

The purpose of this test includes the comparison of a control with compositions including the control plus bromate, the control plus monosodium glutamate, and the control plus monosodium glutamate and L-cysteine.

Dough formulations tested were as follows:

| Ingredient | Dough A | Dough B | Dough C | Dough D |
|---|---|---|---|---|
| Flour* | 700gms. | 700gms. | 700gms. | 700gms. |
| Water | 393gms. | 393gms. | 393gms. | 393gms. |
| Yeast | 28gms. | 28gms. | 28gms. | 28gms. |
| Salt | 14gms. | 14gms. | 14gms. | 14gms. |
| Sugar | 42gms. | 42gms. | 42gms. | 42gms. |
| Milk | 7gms. | 7gms. | 7gms. | 7gms. |
| Shortening | 14gms. | 14gms. | 14gms. | 14gms. |
| Yeast Nutrient | 4.9gms. | 4.9gms. | 4.9gms. | 4.9gms. |
| Monosodium Glutamate | — | — | 75ppm | 75ppm |
| Potassium Bromate | — | 75ppm | — | — |
| L-cysteine | — | — | — | 10ppm |
| *includes starch digesting agent | | | | |
| Dough Pliability Rating | 10 | 9 | 11 | 12 |
| Crust Color Rating | 10 | 9 | 11 | 11.5 |
| Volume, c.c. | 2800 | 2637 | 2725 | 2725 |
| Bread Rating | 83 | 83 | 84 | 84.5 |

In addition to the foregoing ratings, good crumb quality and bread characteristics were displayed by Doughs C and D while Doughs A and B were underdeveloped and had streaky crumb quality.

From the foregoing it will be seen that this invention is one well adapted to attain all the ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

Having thus described my invention, I claim:

1. A method of making a yeast leavened dough product comprising the steps of:
    mixing dough ingredients consisting of flour, water, yeast, a starch digesting agent and monosodium glutamate, said monosodium glutamate added in the amount of 0.001 to 0.010 percent by weight of the flour content;
    relaxing said dough at the completion of said mixing step; and
    machining, proofing and baking said dough.

2. The method as in claim 1, said starch digesting agent selected from the group consisting of wheat malt, barley malt and dehydrated malt syrup.

3. The method as in claim 2, said starch digesting agent present in the proportion of 0.25 to 1.0 percent by weight of the flour content.

4. A method of making a yeast leavened dough product comprising the steps of:
    mixing dough ingredients consisting of flour, water, yeast, a digested starch and monosodium glutamate, said monosodium glutamate added in the amount of .001 to 0.010 percent by weight of the flour content;
    relaxing said dough at the completion of said mixing step; and
    machining, proofing and baking said dough.

5. The method as in claim 4, said digested starch present in the proportion of 0.25 to 1.0 percent by weight of the flour content.

6. A method of making a yeast leavened dough product comprising the steps of:
    mixing dough ingredients consisting of flour, water, yeast, a starch digesting agent, a yeast nutrient in the amount of 0.035 to 0.07 percent by weight of the flour content, and monosodium glutamate in the amount of 0.001 to 0.010 percent by weight of the flour content;
    relaxing said dough at the completion of said mixing step; and
    machining, proofing and baking said dough.

7. The method as in claim 6, said yeast nutrient selected from the group consisting of ammonium chloride and ammonium sulphate.

8. A method of making a yeast leavened dough product comprising the steps of:
    mixing dough ingredients consisting of flour, water, yeast, a starch digesting agent, monosodium glutamate in the amount of 0.001 to 0.010 percent by weight of the flour content and a gluten reducing agent selected from the group consisting of potassium iodate, calcium iodate and L-cystiene hydrochloride monohydrate in the proportion of 0.0005 to 0.003 percent by weight of the flour content;
    relaxing said dough at the completion of said mixing steps; and
    machining, proofing and baking said dough.

9. A method of making a yeast leavened dough product comprising the steps of:
    mixing dough ingredients consisting of flour, water, yeast, a digested starch, a yeast nutrient in the amount of 0.035 to 0.07 percent by weight of the flour content, and monosodium glutamate in the amount of 0.001 percent by weight of the flour content;
    relaxing said dough at the completion of said mixing steps; and
    machining, proofing and baking said dough.

10. The method as in claim 9, said yeast nutrient selected from the group consisting of ammonium chloride and ammonium sulphate.

11. A method of making a yeast leavened dough product comprising the steps of:

mixing dough ingredients consisting of flour, water, yeast, a digested starch, monosodium glutamate in the amount of 0.001 to 0.010 percent by weight of the flour content, and a gluten reducing agent selected from the group consisting of potassium iodate, calcium iodate, and L-cystiene hydrochloride monohydrate in the amount of 0.0005 to 0.003 percent by weight of the flour content;

relaxing said dough at the completion of said mixing steps; and machining, proofing and baking said dough.

* * * * *